United States Patent Office
3,138,925
Patented June 30, 1964

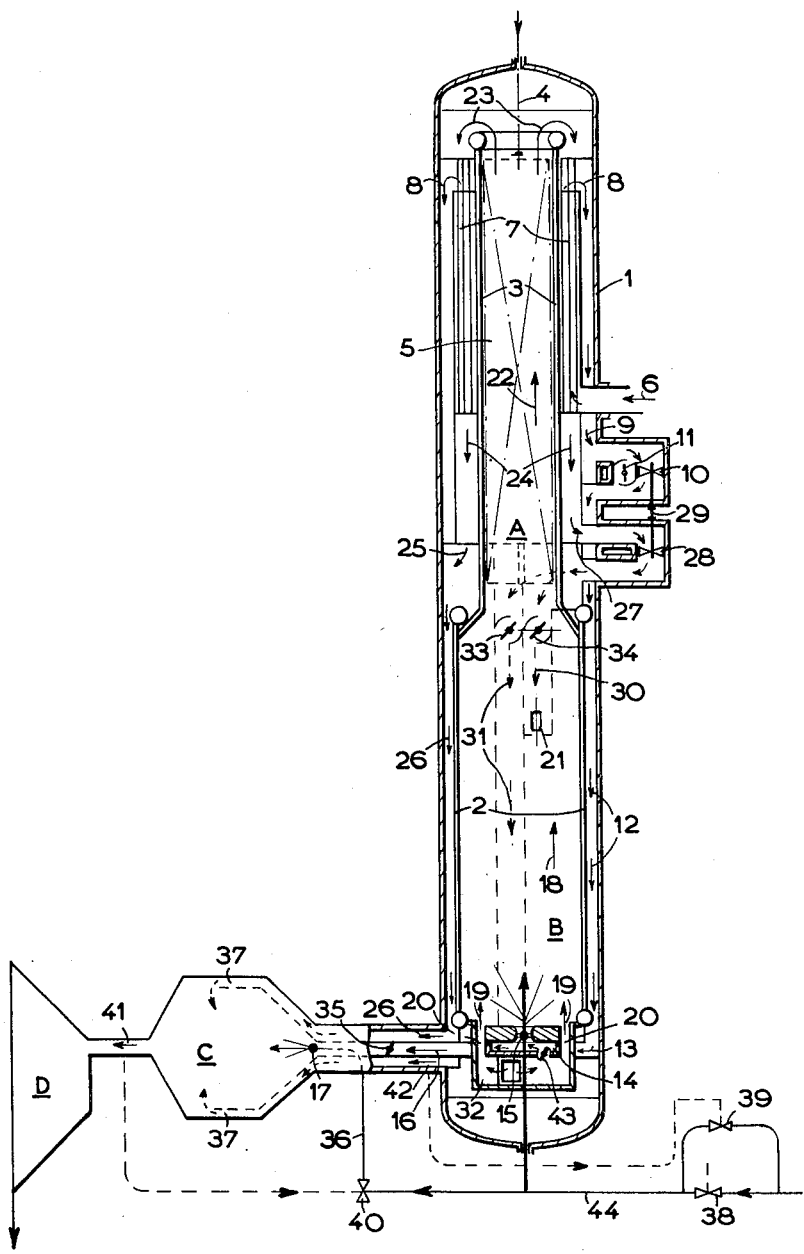

3,138,925
COMBINED STEAM AND GAS TURBINE POWER PLANT
Charles Louis Macherey, Belfort, France, assignor to Societe Generale de Constructions Electriques & Mecaniques (Alsthom), Paris, France, a French body corporate
Filed June 19, 1961, Ser. No. 118,052
Claims priority, application France June 24, 1960
2 Claims. (Cl. 60—39.18)

In certain power-plant installations which produce motive force by the combined use of steam and gas turbines, a pressurised heating apparatus supplied with combustion air by a compressor produces and superheats the steam supplying the steam turbines and afterwards delivers combination gases at a fixed temperature to a gas turbine. This turbine is followed, in the path of the gases, by heat exchangers and finally by a second gas turbine.

It is important, from the point of view of the output of energy of the installation, that the fixed temperature at the exhaust of the heating apparatus be maintained at the maximum which is compatible with the resistance to heat of those constituent parts of the gas turbine which are most exposed to this heat.

Under the effect of the cooling action of the fluid to be vapourized and superheated there is established, in the heating apparatus and the heat exchangers which it comprises, a prevalence of more moderate temperatures than that which prevails in the inner regions of the gas turbine, but the passage of the heat, due to the gradients in temperature which are present in the walls separating the heating fluid from the heated fluid, gives rise to difficulties of another kind where the direct action of the heat is added to that of the stresses—superimposed on the mechanical stresses—which result from this flow. The expandable materials resist this combination of harmful actions only if there exists in the gas flow a cold source which is used for the moderation of the exchanges, at the price of a greater number of surfaces. Thus the simple arrangement in which the gases would be cooled from the combustion temperature to the temperature of entry into the gas turbine, without at least a portion of these passing through cooler states, is not possible.

It is an object of the invention to provide an improved power-plant installation of the kind having a pressurised heater provided with a primary combustion chamber which heats the vapouriser and the superheater.

It is a further object of the invention to cool the combustion gases to a temperature below the temperature of inlet into a gas turbine provided in the plant.

The invention also provides a method of reheating the air by the gases, taking the air to, or close to, the temperature of the cooled gases, and this allows the currents of air and gases to equalize the temperature of the envelope of the heater and entails a decrease in the recirculating powers and the dimensions of the recirculating apparatus.

In accordance with the invention, all the air—including the combustible air of secondary combustion—is caused to pass into the heater tubes, in order to obtain a reserve of power for the recirculating turbo-ventilators driven by this air, to have a surplus of diluent air for operating at low loads and to decrease the amount of piping.

The temperature at the output of the heater and at the output of the secondary combustion chamber are regulated by an impulse which is a function of the temperature to be regulated, acting upon the fuel injection valves in the primary combustion chamber and in the secondary combustion chamber, these controls distributing all the fuel between the two combustions, while all the fuel is regulated by the conventional heating regulator as occasioned by the vapour requirements.

In order that the invention may be more clearly understood, reference will now be made to the accompanying drawing which diagrammatically shows one particular embodiment thereof, purely by way of example.

The drawing shows an installation in which, according to the invention, a heater A with a pressurised burner B sends the gases into a secondary combustion chamber C where they are reheated before entering the gas turbine D. It will be understood that the parts A–D are well known in themselves and have therefore been only diagrammatically represented.

The heater A and the burner B are enclosed in a pressure-resistant envelope 1. The heater comprises a vaporizer diagrammatically represented by the vaporizer tubes 2 and their extensions 3. The super-heater, which is supplied at 4 with saturated or already superheated steam, and which is made up of straight tubes, is diagrammatically shown at 5. The interconnections between the vapourizer and the heater, between the superheater and the heater and the high pressure turbine, which follow practice conventional in the art, are not shown.

The combustible air delivered by the compressor enters the heater at 6; it passes vertically through to the equi-pressure air reheater 7, outside the tubes. At the outlet of this apparatus the air current is reversed in the direction of the arrow 8 and passes vertically from top to bottom, passing the walls of the envelope 1, the temperature of which it equalizes.

The direction of flow of air is branched at 9 and enters the turbine 10 of a turbo-ventilator assembly driving the recirculation gases. A throttle 11 allows a portion of this flow to be tapped off if necessary. All the air passing the turbine 10 and finally in the branch regulated by the throttle 11 travels downwards, in the direction of the arrows 12, along the walls of the heater, and, following the arrow 13, passes into the chamber 14 which supplies air to the burners, diagrammatically shown at 15, of the combustion chamber B. A portion of this air leaves the chamber 14 in the direction of the arrow 16 and is passed to the burners 17 of the secondary combustion chamber C.

The air which passes into the burners 15 serves as fuel for the primary combustion. The gases of primary combustion rise in the direction of the arrow 18 in the combustion chamber B giving the tubes 2 the heat necessary for vaporization. These primary combustion gases are boosted with recirculated gases injected along the direction shown by the arrows 19 through the nozzles 20. The quantity of recirculated gases injected by the nozzles 20 is regulated so as to proportion the heat exchange in the vapourizer 2 according to the steam required. In the upper portion of the combustion chamber, the gases, which rise in the direction of the arrow 18, are added to a suitable portion of the recirculated gases injected by the nozzles 21. The mixture of gases enters the superheater 5 along the path indicated by arrow 22. The amount of gases injected at 20 and 21 is such that the exchange in the superheater 5 corresponds to the actual vaporization and to the temperature which it is desired to reach.

At the output of the superheater, the vapour gas flow, which has been reversed as shown by the arrows 23, enters the air reheater 7 and flows downwards inside the tubes of this exchanger. It comes out in the direction of the arrows 24 at a temperature equal or nearly equal to the temperature of the combustion air which flows along the path indicated by arrow 12.

The portion of the gases corresponding to the emission of the burner 15 follows the path indicated by the arrows 25 and 26. The recirculated portion of the gases is directed along the path shown at arrow 27 into the ventilator 28 of the recirculating turbo-ventilator. The ventilator 28 is fixed on the shaft 29 of the air turbine 10. It relieves the pressure of the recirculated vapours so as to allow them to be injected at 20 and 21 into the primary combustion chamber.

The equality of the temperatures of the fluids passing the walls of the heater in the direction shown by arrows 12 and 26 ensures the even expansion of these walls.

The recirculated gases, which are travelling along the path indicated by arrow 30, are injected at 21; the gases which are travelling along the path of arrows 31 arrive at the chamber 32 and are discharged by nozzles 20 into the combustion chamber B. Throttles 33 and 34 serve to regulate the total quantity of the recirculated gases and to distribute this total quantity between the openings 20 and 21.

The air taken from the chamber 14 and passed to the secondary combustion chamber C is regulated by the throttle 35 in proportion to the quantity of fuel supplying the secondary combustion chamber C via the pipe 36. The combustion gases are mixed with the gases arriving at 37 from the heater A and raise the temperature thereof before entering turbine D.

The quantity of fuel is regulated by valves 38, 39 and 40. For a given opening of the valve 38, subjected to the heat regulator, the valve 40, under the influence of the temperature at 41 at the output of the chamber C, regulates the fuel passing into the pipe 36 in such a way as to maintain the temperature at 41 at a given fixed value. The valve 39 located on a pipe branched off from the pipe carrying the valve 38, under the influence of the temperature at 42 at the output of the heater A, regulates this temperature to a fixed selected temperature.

For a given opening of the valve 38 the regulations of the valves 39 and 40 thus regulate the distribution of all the fuel between the primary and secondary combustions. The valve 38, subjected to the heat regulator, for given temperatures at 41 and 42 regulates the quantity of fuel necessary to satisfy the steam requirements of the steam turbine.

At maximum load, all the air arriving in the chamber 14 and the burners 15 is divided into two portions. One, used for the primary combustion is passed to the burners 15, the other, used for the secondary combustion, is passed to the burners 17. The total quantity of air does not vary with the load if the compressor revolves at a constant speed. At partial loads, the throttle 43 is opened and allows the excessive portion of air to pass into the chamber 32 which delivers it to the combustion chamber. The butterfly valves 33 then take up the position which is suitable for the actual vaporization. The throttle 43 is regulated by the influence of the quantity of fuel at 44 proportionally to the difference between the total quantity of air and the air necessary for the actual combustion.

At a determined load the butterfly valves 33 and 34, the positions of which are connected and the regulation of which is subjected to the influence of the superheating temperature, are placed in a position such that this temperature has a given level. The regulation of the valves 39 and 40, on the other hand, fixes the temperatures at 42 and 41. In these conditions, if the position of the valve 38 corresponds to the actual steam requirement, the vaporization is automatically regulated by the regulation alone of the superheating. In the opposite case the heating regulator acts upon the valve 38 to render the vaporized quantity equal to the requirement of the steam turbine.

The regulation of the temperature of the gases at 42 is carried out in order to eliminate any freedom of distribution of the fuel between the two primary and secondary combustions. It also has the object of rendering the temperature of the wall 1 of the heater constant, this wall being contacted by the constant temperature gases and by the air which is at a temperature very nearly equal to the temperature of the gases. Apart from this it allows the regulation of the vaporization to be centred on the regulation of the valve 38, that is to say that, assuming that the valve 38 is in a good position, the regulation of the superheating is thus a regulation of the vaporization, always on the condition that the water supply arrives at a constant temperature and in the case in which the superheater is a resuperheater, on condition that the steam arrives at a constant temperature at this apparatus.

Since the temperature at 42 is regulated to a fixed value, the single recirculation at 20 in principle suffices to regulate the superheating and the vaporization. If the superheating temperature is too high, the superheating regulator closes the butterfly valve 33, which lowers the superheating temperature and increases vaporization, which vaporization is corrected by the regulation of the valve 38.

This regulating process is carried out whatever the position of the butterfly valve 34 and even in the closed position thereof. In any case it is important to maintain the injection 34 at its maximum rate or thereabouts, which injection is useful for limiting the temperature of the gases in the hotter portions of the superheater. When the rate decreases the butterfly valve 33 opens and the butterfly valve 34, connected to the butterflfly valve 33, closes. The connection is established, bearing in mind the entry of additional air into the recirculating gases by the automatic opening of the butterfly valve 43 at partial loads.

I claim:

1. A combined steam and gas turbine power plant comprising a primary combustion chamber being fed with air under pressure; a boiler connected to receive combustion gases produced in said combustion chamber; heat exchanger means connected to receive the combustion gases as they leave the boiler, said exchanger means cooling said combustion products; means dividing the cooled combustion products into two portions; means for pumping one of said portions back to the boiler to recycle that portion of the cooled products; a second combustion chamber being fed with air under pressure; means conducting the other of said cooled portions along the walls of said boiler, for cooling thereof, to said second combustion chamber, wherein said products are reheated; a turbine driven by air under pressure located between said heat exchanger and said second combustion chamber; said turbine driving said pumping means; and means conducting said reheated portion of combustion products to drive a gas turbine.

2. A combined steam and gas turbine power plant as claimed in claim 1 in which said heat exchanger means comprises an air cooler through which all of the air fed to said combustion chambers is led before it reaches said turbine and chambers.

References Cited in the file of this patent

UNITED STATES PATENTS

| | | |
|---|---|---|
| 2,224,544 | Keller | Dec. 10, 1940 |
| 2,608,822 | Pavlecka | Sept. 2, 1954 |
| 2,859,954 | Grey | Nov. 11, 1958 |

FOREIGN PATENTS

| | | |
|---|---|---|
| 1,193,883 | France | May 4, 1959 |